United States Patent [19]

Price-Falcon et al.

[11] 4,253,867
[45] Mar. 3, 1981

[54] METHOD OF USING A METHANE-CONTAINING GAS FOR REDUCING IRON ORE

[75] Inventors: Juan F. Price-Falcon, Garza Garcia; Enrique R. Martinez-Vera, Monterrey, both of Mexico

[73] Assignee: Hylsa, S.A., Monterrey, Mexico

[21] Appl. No.: 84,750

[22] Filed: Oct. 15, 1979

[51] Int. Cl.³ .................................. C21B 13/02
[52] U.S. Cl. ........................................ 75/35
[58] Field of Search ............................ 75/34, 35

[56] References Cited

U.S. PATENT DOCUMENTS

| | | | |
|---|---|---|---|
| 2,367,262 | 1/1945 | Brassert | 75/35 |
| 3,909,446 | 9/1975 | Miyashita et al. | 75/35 X |
| 4,054,444 | 10/1977 | Clark et al. | 75/35 |
| 4,150,972 | 4/1979 | Price-Falcon et al. | 75/35 |

*Primary Examiner*—M. J. Andrews
*Attorney, Agent, or Firm*—Curtis, Morris & Safford

[57] ABSTRACT

A method of using coke oven gas, and more generally gaseous mixtures containing up to about 30% by volume of methane, for the direct gaseous reduction of iron ore in a vertical shaft, moving bed reactor. In addition to the usual reduction zone and cooling zone, the reactor is provided with an intermediate reforming zone. A hot mixture of coke oven gas and steam is fed to the intermediate zone and reduced ore therein catalyzes the conversion of the methane of the coke oven gas to carbon monoxide and hydrogen. The reformed gas flows upwardly into the reduction zone of the reactor.

8 Claims, 1 Drawing Figure

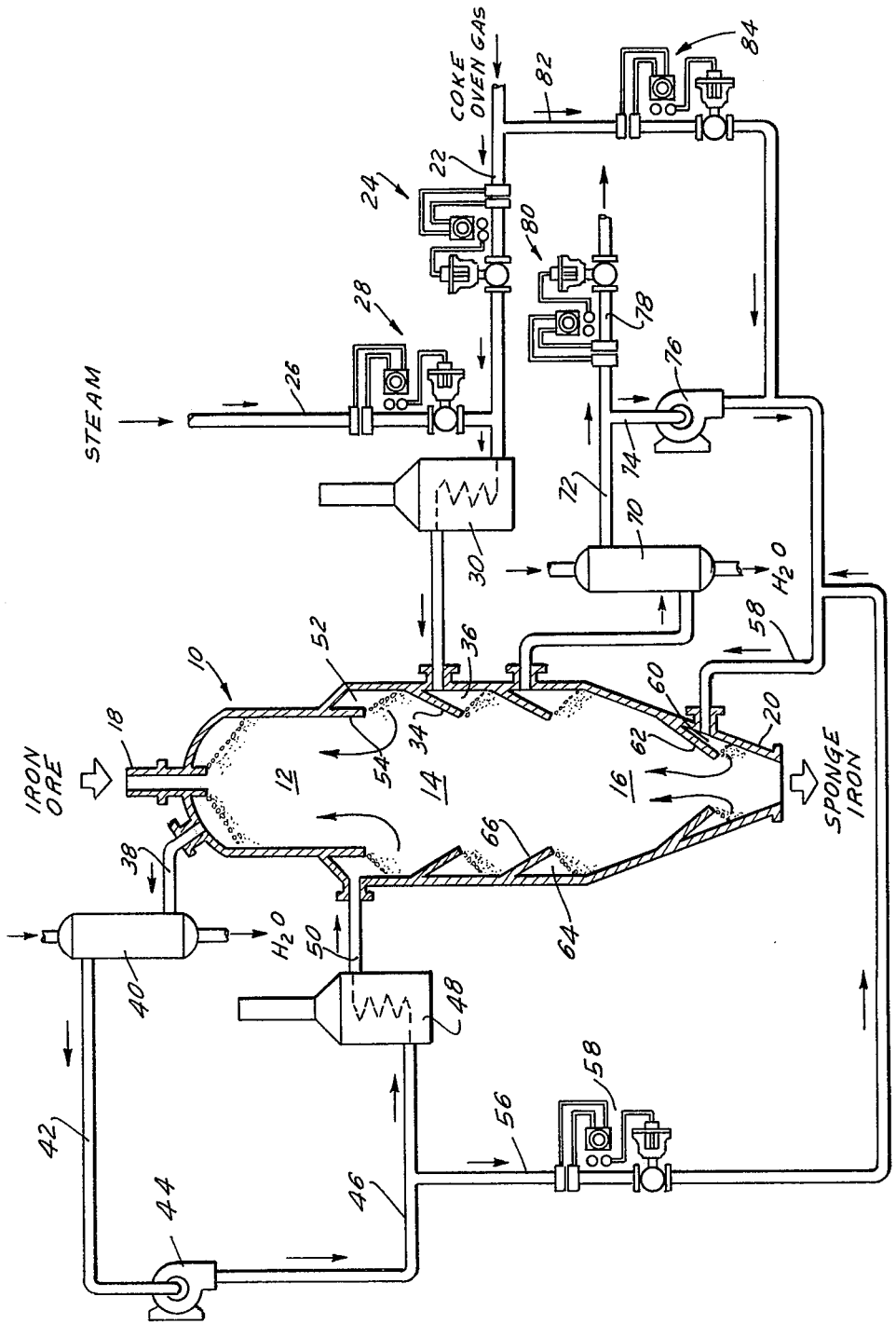

METHOD OF USING A METHANE-CONTAINING GAS FOR REDUCING IRON ORE

This invention relates to the gaseous reduction of iron ore in a vertical shaft, moving bed reactor to form sponge iron, and more particularly, to a method for using as a source of reducing units in such a gaseous reduction process a gas containing up to about 30% by volume of methane, especially coke oven gas.

Typical gaseous reduction systems incorporating vertical shaft, moving bed iron ore reduction reactors are disclosed in U.S. Pat. Nos. 3,765,872; 3,770,421; 3,779,741; and 3,816,102. In such systems reduction of the ore has commonly been effected by a reducing gas largely composed of carbon monoxide and hydrogen obtained by catalytic reformation of a mixture of natural gas and steam. Such systems typically comprise a vertical shaft reactor having a reducing zone in the upper portion thereof and a cooling zone in the lower portion thereof. The ore to be reduced is fed to the top of the reactor and flows downwardly therethrough, first through the reducing zone wherein it is brought into contact with heated reducing gas from the reformer and then through a cooling zone wherein it is cooled by a gaseous coolant before being removed at the bottom of the reactor. Effluent gas from the reducing zone is cooled to remove water therefrom and in most cases a major part of the cooled effluent gas is reheated and recycled to the reducing zone. Similarly, at least a part of the coolant gas withdrawn from the cooling zone is commonly cooled and recycled to the cooling zone. At its lower end the reactor is provided with some means for controlling the discharge of the cooled sponge iron from the reactor, e.g., a rotary discharge valve, a vibratory chute, conveyor belt, or the like.

It has recently been found advantageous to utilize the sponge iron produced in such a reactor as a part of the feed to a blast furnace. By using sponge iron as a part of the blast furnace feed, the productivity of the furnace can be increased and the coke requirement of the furnace can be reduced. Thus significant economies in blast furnace operations can be achieved in this way.

Since blast furnaces use coke both as a fuel and as a reducing agent and in substantial amounts, they are commonly located near a battery of coke ovens that produce both coke and by-product coke oven gas containing reducing constituents. In cases where sponge iron is to be used as part of the blast furnace feed, it would be economically advantageous to integrate the sponge iron plant with the blast furnaces and coke plant, i.e., to locate the sponge iron production unit near the blast furnaces. Such physical juxtaposition of the sponge iron plant and blast furnaces would provide a number of advantages. Thus the amount of handling of the product sponge iron and the need for cooling the product sponge iron would both be decreased. It is known that at elevated temperatures sponge iron has a tendency to re-oxidize when exposed to the atmosphere. Hence in those cases where the product sponge iron is to be stored for extended periods of time or shipped considerable distances, relatively complete cooling of the sponge iron is an important factor. On the other hand, where the product sponge iron is to be promptly used in a furnace or the like, the need for thorough cooling is eliminated.

A further potential advantage of such an integrated plant is the possibility of utilizing the by-product coke oven gas as a source of reducing constituents for the gaseous ore reduction reactor. One problem involved in this approach arises out of the fact that raw coke oven gas is not a very effective reducing agent for iron ore. While it is possible to treat the coke oven gas to improve its reducing effectiveness by, for example, a catalytic reforming process, the existing catalytic reformers require a sizeable capital investment that substantially increases the cost of the treated gas. Also coke oven gas has a relatively high sulfur content which adversely affects the catalysts usually employed in known catalytic reformers. Hence if the coke oven gas is to be reformed in a known type of catalytic reformer, the sulfur content of the gas must first be reduced to a very low level. Thus a need exists for an improved method of upgrading the reducing effectiveness of raw coke oven gas.

It is accordingly an object of the present invention to provide an improved method of reforming a coke oven gas to increase its effectiveness as an iron ore reducing agent. It is another object of the invention to provide a method of iron ore reduction that facilitates integration of a sponge iron production plant with one or more blast furnaces and a battery of coke ovens to achieve an overall increase in the productivity of the blast furnaces and an improvement in fuel economy. It is a still further object of the invention to eliminate the need for a separate catalytic gas reformer for upgrading the reducing effectiveness of the coke oven gas. More broadly it is an object of the invention to provide an improved method of using as a source of reducing units in a vertical shaft moving bed iron ore reduction process a gas containing up to 30% by volume of methane. Other objects of the invention will be in part obvious and in part pointed out hereafter.

The objects of the present invention are achieved in general by utilizing a moving bed reactor having in addition to the usual reducing zone and cooling zone an intermediate gas reforming zone through which the reduced ore flows before entering the cooling zone. A mixture of the methane-containing gas, e.g., coke oven gas and steam is preheated and fed to this reforming zone and the reduced ore, i.e., sponge iron, in this zone effectively catalyzes the conversion of the methane content of the coke oven gas to carbon monoxide and hydrogen. The reformed coke oven gas then flows upwardly into the reduction zone of the reactor.

It has been found that the feed coke oven gas need not be completely de-sulfurized in the present process since deposition of sulfur on the sponge iron in the cooling zone does not adversely affect its activity and in any event the sponge iron forms a continually renewed catalyst mass. The amount of sulfur deposited on the sponge iron can readily be adjusted during the subsequent steel-making step. Thus the de-sulfurizing cost is reduced with the present process.

The objects and advantages of the present invention can best be understood and appreciated by reference to the accompanying drawing which is a diagrammatic illustration of a direct reduction system adapted to be used in carrying out a preferred embodiment of the method of the invention.

Referring to the drawing, the numeral 10 generally identifies a vertical shaft, moving bed reactor comprising a reduction zone 12, a reforming zone 14, and a cooling zone 16. Iron ore to be reduced is charged to the top of reactor 10 through the inlet 18 and sponge iron is removed at the bottom of the reactor through the outlet 20.

Coke oven gas enters the system through a pipe 22 containing a flow controller 24 and is mixed with steam supplied through pipe 26 containing flow controller 28. The steam is added in sufficient quantity to react with the methane content of the coke oven gas to convert it into carbon monoxide and hydrogen according to the following equation:

$$CH_4 + H_2O \rightarrow CO + 3H_2$$

Desirably a stoichiometric excess of steam is used to inhibit undesired carbon deposition within the reactor. Typically the molar ratio of steam to methane may be in the range 1:1 to 1.5:1.

The mixture of coke oven gas and steam flows to a heater 30 wherein it is heated to a temperature of say 700° to 900° C. and thence through pipe 32 to the reactor 10. More particularly, the reactor 10 is provided with an internal frusto-conical baffle 34 which together with the side of the reactor forms an annular space 36 into which the gas mixture flows. From the space 36 the gas flows around the bottom of the baffle 34 into the reforming zone 14 where it comes in contact with the descending bed of iron-bearing material which at this level in the reactor is largely reduced to sponge iron. As indicated above, the sponge iron catalyzes the steam/methane reaction to produce carbon monoxide and hydrogen which are effective reducing agents for iron ore and the reformed gas then flows upwardly into the reduction zone 12 where it reduces the incoming iron ore.

In order to increase the efficiency of utilization of the reducing gas, a portion thereof is recycled. Thus gas leaving the top of the iron-bearing bed in reactor 10 is withdrawn through pipe 38 and flows to and through a quench cooler 40 wherein it is cooled to remove water therefrom. The cooled gas then flows through pipe 42, pump 44 and pipe 46 to heater 48 wherein it is reheated to a temperature of say 750° to 1000° C. From heater 48 the heated gas flows through pipe 50 to the annular space 52 formed by internal baffle 54 and the adjacent side wall of the reactor and thence around the bottom of baffle 54 back to the reduction zone 12. Thus the reducing gas flows in a closed loop including cooler 40, pump 44, reheater 48 and the reduction zone 12 of the reactor with fresh reducing gas being supplied to the loop from the reforming zone 14.

A certain amount of the recycled reducing gas is withdrawn from the reducing gas loop through pipe 56 containing flow controller 57 and flows to a cooling loop as shown in the lower portion of the drawing. Thus the cooled gas from pipe 56 flows into the pipe 58 and thence to the bottom of the cooling zone 16 of the reactor. More particularly, the gas flowing through pipe 58 enters an annular space 60 formed by a frusto-conical baffle 62 and the adjacent portion of the side walls of the reactor. The cooling gas then flows under the bottom of baffle 62 and upwardly through the bed of sponge iron within the cooling zone. After passing through the cooling zone the gas flows into an annular space 64 formed by the frusto-conical baffle 66 and the adjacent side wall of the reactor and thence out of the reactor through pipe 68 to and through a quench cooler 70 wherein it is cooled and dewatered.

From cooler 70 the cooled gas flows through pipes 72 and 74 to pump 76 from which it is discharged into pipe 58 and returned to the cooling zone 16. A portion of the recycled cooling gas is withdrawn from the cooling loop through pipe 78 containing flow controller 80 and flows to a suitable point of storage or a point at which it can be used as a fuel. If desired, coke oven gas can be withdrawn from pipe 22 through a pipe 82 containing a flow controller 84 and supplied to pipe 58 to provide a fresh supply of gas for the cooling loop.

From the foregoing description it should be apparent that the present invention provides an exceptionally effective way of preparing and utilizing a reformed coke oven gas in the direct reduction of iron ore to produce sponge iron. As pointed out above, it is known that sponge iron can be advantageously mixed with the iron ore bed to a blast furnace to improve the productivity thereof. Also blast furnaces are commonly located at sites at which by-product coke oven gas is available. While such coke oven gas can be and is presently used as a fuel, its value in the present process is substantially enhanced in that it is used as one of the raw materials of a chemical reduction reaction. In addition, by carrying out the catalytic conversion of the steam/methane mixture within the reforming zone 14 of reactor 10, the need of a separate catalytic reformer is eliminated and an exceptionally economical gas reforming step is provided.

From the foregoing description it should be apparent that the present invention provides a method and apparatus capable of achieving the objects set forth at the beginning of the present specification. Thus an exceptionally economical method of reforming a methane-containing gas to increase its effectiveness as an iron ore reducing agent is provided. In cases where coke oven gas is used this increased effectiveness is in part due to the fact that the by-product coke oven gas, which might otherwise be used as a fuel, is employed as a chemical raw material and in part due to the fact that the reforming reaction is effected within the reduction reactor rather than in a separate catalytic reformer. Also the present method facilitates integration of a sponge iron production plant with existing blast furnace and coke oven plants to achieve an overall increase in blast furnace productivity and improve thermal economy.

It is of course to be understood that the foregoing description is intended to be illustrative only and that numerous changes can be made in the described process and apparatus without departing from the spirit of the invention as defined in the appended claims. For example, in cases where the gas circulated through the cooling zone contains reducing values, it may be desirable to so operate the cooling zone as to cause a portion of the circulating gas to flow upwardly into the reducing zone.

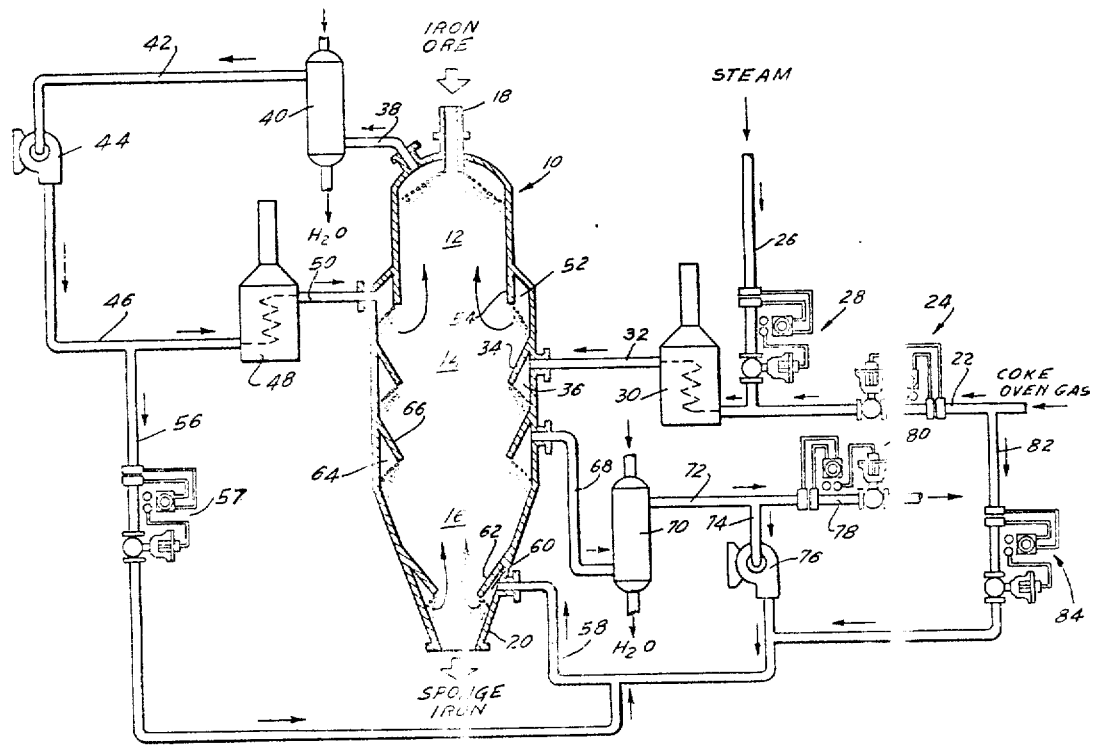

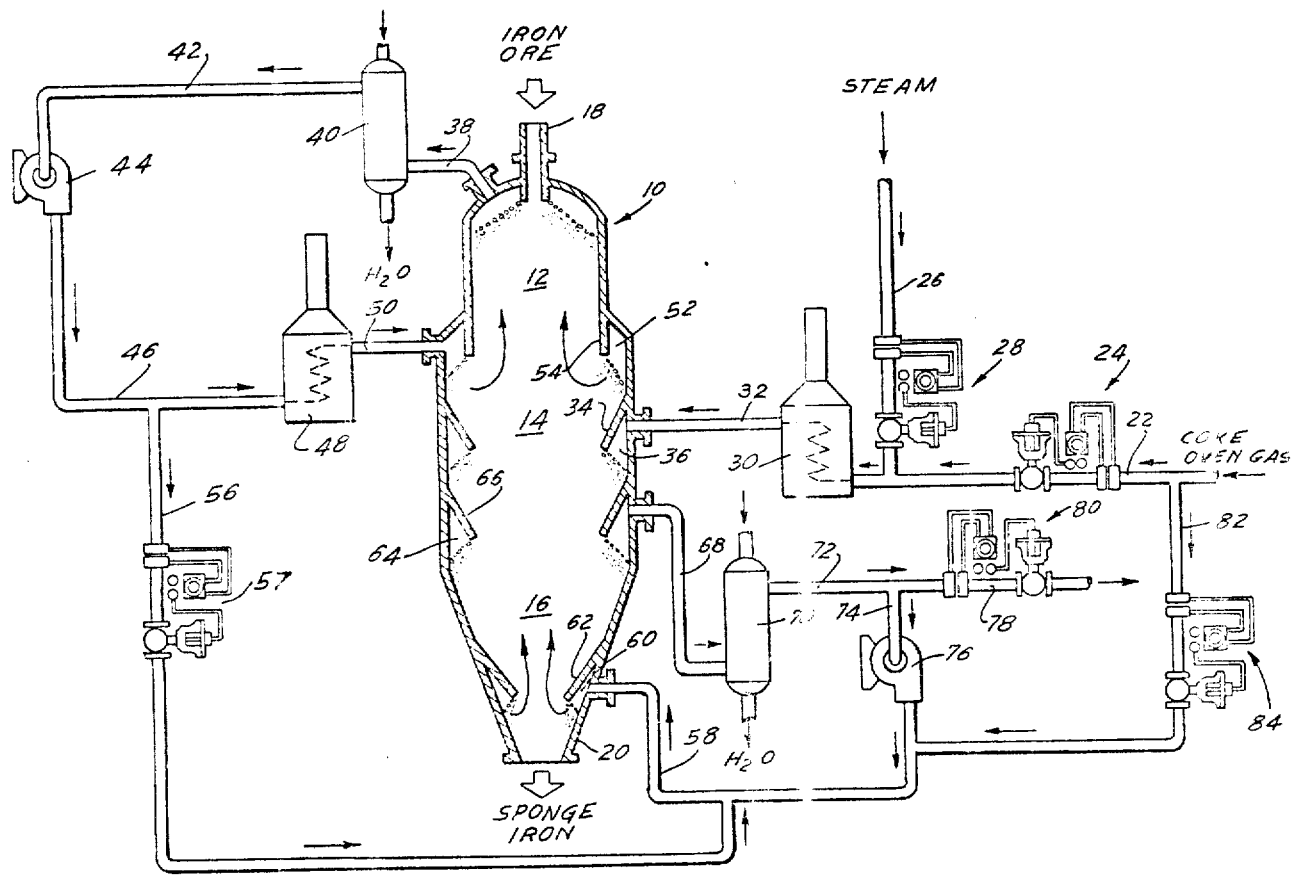

We claim:

1. The method of reducing particulate iron ore to sponge iron particles in a vertical moving bed reactor having a reduction zone in the upper part thereof into which a hot reducing gas is fed to cause reducing gas to flow through a portion of said bed to reduce iron ore thereof to sponge iron, a cooling zone in the lower part of the reactor through which a cooling gas is circulated and externally cooled to cool said sponge iron and an intermediate zone between the point at which said reducing gas is fed to said reduction zone and the upper end of the path of said cooling gas through said cooling zone, which comprises preparing a mixture of steam and a gas containing up to about 30% by volume of methane, heating said gaseous mixture to a temperature of 700° to 900° C., passing said heated gaseous mixture through said intermediate zone in contact with the iron-bearing material therein to reform said gas and increase the proportion of reducing constituents therein and causing said reformed gas to flow into said reduction zone.

2. A method according to claim 1 wherein said cooling zone forms part of a loop through which a cooling gas is pumped, cooling gas is vented from said loop at a controlled rate and a gas containing up to about 30% by volume of methane is supplied to said loop as a make-up gas.

3. A method according to claim 1 wherein said reduction zone forms part of a loop through which the reducing gas is pumped, the reducing gas leaving said reduction zone is cooled to remove water therefrom and then reheated before re-entering said reduction zone and a portion of the cooled circulating reducing gas from said reducing gas loop is transferred as make-up gas to said cooling zone.

4. A method according to claim 1 wherein said methane-containing gas is coke oven gas.

5. A method according to claim 2 wherein said methane-containing gas is coke oven gas.

6. A method according to claim 1 wherein said cooling zone forms part of a loop through which a cooling gas is pumped, cooling gas is vented from said loop at a controlled rate and make-up gas is supplied to said cooling loop, said make-up gas comprising both coke oven gas and cooled reducing gas from said reduction zone.

7. A method according to claim 1 wherein said cooling zone forms part of a loop through which the reducing gas is pumped, cooling gas is vented from said loop at a controlled rate, and make-up gas is supplied to the cooling zone at a rate to cause gas flow from said cooling zone upwardly into said intermediate zone.

8. A method according to claim 1 wherein the ratio of steam to methane in said gaseous mixture is from 1:1 to 1.5:1.

* * * * *

UNITED STATES PATENT AND TRADEMARK OFFICE
CERTIFICATE OF CORRECTION

PATENT NO. : 4,253,867

DATED : March 3, 1981

INVENTOR(S) : Juan F. Price-Falcon et al.

It is certified that error appears in the above—identified patent and that said Letters Patent is hereby corrected as shown below:

The title page should be deleted to appear as per attached title page.

The sheet of drawing showing the drawing figure should be deleted to appear as per attached page 3.

Signed and Sealed this

Thirteenth Day of April 1982

[SEAL]

Attest:

GERALD J. MOSSINGHOFF

Attesting Officer

Commissioner of Patents and Trademarks

United States Patent [19]
Price-Falcon et al.

[11] 4,253,867
[45] Mar. 3, 1981

[54] METHOD OF USING A METHANE-CONTAINING GAS FOR REDUCING IRON ORE

[75] Inventors: Juan F. Price-Falcon, Garza Garcia; Enrique R. Martinez-Vera, Monterrey, both of Mexico

[73] Assignee: Hylsa, S.A., Monterrey, Mexico

[21] Appl. No.: 84,750

[22] Filed: Oct. 15, 1979

[51] Int. Cl.³ .............................................. C21B 13/02
[52] U.S. Cl. ................................................... 75/35
[58] Field of Search ...................................... 75/34, 35

[56] References Cited
U.S. PATENT DOCUMENTS

| | | | |
|---|---|---|---|
| 2,367,262 | 1/1945 | Brassert | 75/35 |
| 3,909,446 | 9/1975 | Miyashita et al. | 75/35 X |
| 4,054,444 | 10/1977 | Clark et al. | 75/35 |
| 4,150,972 | 4/1979 | Price-Falcon et al. | 75/35 |

Primary Examiner—M. J. Andrews
Attorney, Agent, or Firm—Curtis, Morris & Safford

[57] ABSTRACT

A method of using coke oven gas, and more generally gaseous mixtures containing up to about 30% by volume of methane, for the direct gaseous reduction of iron ore in a vertical shaft, moving bed reactor. In addition to the usual reduction zone and cooling zone, the reactor is provided with an intermediate reforming zone. A hot mixture of coke oven gas and steam is fed to the intermediate zone and reduced ore therein catalyzes the conversion of the methane of the coke oven gas to carbon monoxide and hydrogen. The reformed gas flows upwardly into the reduction zone of the reactor.

8 Claims, 1 Drawing Figure